United States Patent [19]

Wu

[11] Patent Number: 4,978,327
[45] Date of Patent: Dec. 18, 1990

[54] COUPLING PORTION OF A CHAIN

[76] Inventor: Chia L. Wu, No. 734, Chung Shan Rd., Kwei Jen Hsiang, Tainan Hsien, Taiwan

[21] Appl. No.: 504,573

[22] Filed: Apr. 4, 1990

[51] Int. Cl.⁵ .............................................. F16G 13/02
[52] U.S. Cl. .................................. 474/228; 474/231; 474/230; 59/4
[58] Field of Search ............... 474/206, 212, 230, 231, 474/233, 234, 228, 225, 224, 219, 202, 213; 59/4, 5, 8, 78, 901

[56] References Cited

U.S. PATENT DOCUMENTS

| | | | |
|---|---|---|---|
| 639,575 | 12/1899 | Anon | 474/228 |
| 1,166,460 | 1/1916 | Hughes | 59/8 |
| 2,246,810 | 11/1938 | Nicolai | 474/224 |
| 4,265,134 | 5/1981 | Dupoyet | 474/231 |
| 4,704,099 | 11/1987 | Rohloff | 474/231 |

Primary Examiner—Ramon S. Britts
Assistant Examiner—Roger J. Schoeppel
Attorney, Agent, or Firm—Poms, Smith, Lande & Rose

[57] ABSTRACT

A chain has pairs of inner sheets and pairs of outer sheets. Each sheet has two rings. An annular flange is formed on each ring. An inner surface of an opposite end to a free edge of each annular flange is rounded so as to form a recess. Each annular flange of the outer sheet is received in the recess of one inner sheet. A pin is inserted through the annular flanges of a pair of inner sheets and a pair of outer sheets. Both ends of the pin are deformed so as to be received in the recesses of the outer sheets.

1 Claim, 5 Drawing Sheets

COUPLING PORTION OF A CHAIN

BACKGROUND OF THE INVENTION

The present invention relates to a chain, and more particularly to a coupling portion of a chain.

Chain is widely used as chain transmission in bicycle or motocycle. A conventional chain is shown in FIGS. 4 and 5 and comprises a plurality pairs of inner sheets I and a plurality pairs of outer sheets O alternatively coupled together. A pair of bushes B are coupled between pair of inner sheets I. A roller R is rotatably provided on each bush B. A pin P passes each bush B and is fixed between each pair of outer sheets O. Both ends of each pin P extend beyond the outer sheets O. The ends of the pin P are disc shaped so that the sheets I and O are coupled together. The protruded ends of the pins P affect the shifting of the gears of the bicycle which has multispeeds.

The present invention has arisen to mitigate and/or obviate the afore-described disadvantages of the conventional chains.

SUMMARY OF THE INVENTION

The primary objective of the present invention is to provide a coupling portion of a chain which has a flat outer surface without protrusions.

In accordance with one aspect of the invention, there is provided a chain which includes a number of pairs of inner sheets and a number of pairs of outer sheets alternatively coupled together. Each inner sheet and outer sheet has two rings integrally formed together. An annular flange is formed on a center of each ring. An inner surface of an opposite end to a free edge of each annular flange is rounded so as to form a recess. A roller is rotatably supported between each pair of annular flanges of the inner sheets. Each annular flange of the outer sheet is received in one recess. A pin is inserted through the annular flanges of a pair of inner sheets and a pair of outer sheets. Both ends of the pin are deformed so as to be enlarged and engaged in the recesses of the outer sheets.

Further objectives and advantages of the present invention will become apparent from a careful reading of the detailed description provided hereinbelow, with appropriate reference to the accompanyin drawings.

DETAILED DESCRIPTION OF THE INVENTION

Figure 1:
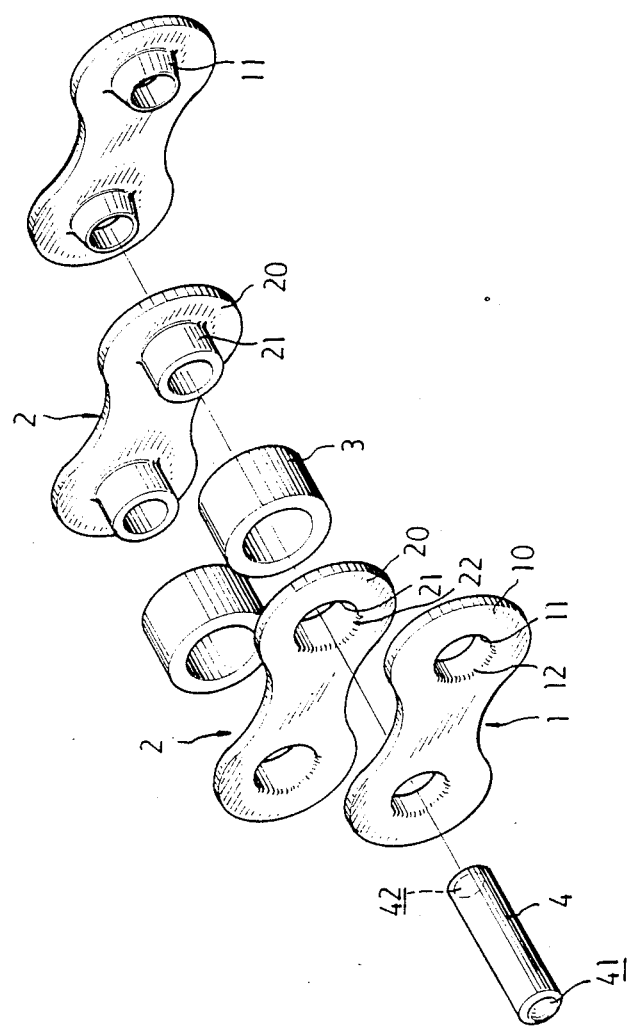
FIG. 1 is an exploded view of a chain in accordance with the present invention.
Figure 2:
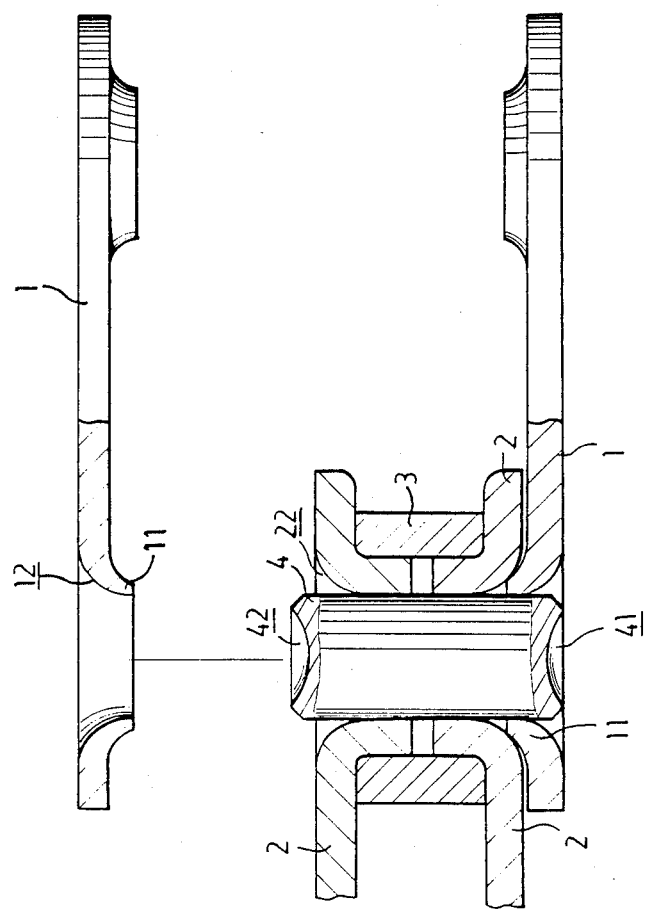
FIG. 2 is a partial cross sectional view of the chain, in which an outer sheet is separated.

Referring to the drawings and initially to FIGS. 1 and 2, illustrated is a section of a chain in accordance with the present invention. Each section comprises generally a pair of outer sheets 1 and a pair of inner sheets 2 which are alternatively coupled together to form the chain. Each sheet 1, 2 is substantially bone shaped or has substantially two rings 10, 20 integrally fixed together. Each ring 10, 20 has an annular flange 11, 21 which is substantially perpendicular to the ring 10, 20. The inner surface of the opposite end to the free edge of each annular flange 11, 21 is rounded so as to form a recess 12, 22. The outer peripheral surface of the annular flange 11 is tapered, or, the width of the annular flange 11 is reduced toward the free edge thereof so that the annular flange 11 is receivable in a respective recess 22 and so that the inner surfaces of the annular flanges 11, 21 are aligned. Two rollers 3 which are cylindrical are slidably supported between each pair of inner sheets 2 around the annular flanges 21 thereof. A depression 41, 42 is formed in each end of a pin 4. The outer diameter of the pin 4 is equal or slightly less than the inner diameter of the annular flanges 11, 21 so that the pin 4 is insertable into the annular flanges 11, 21. Alternatively, the pin 4 may be a cylindrical tube.

Figure 3:
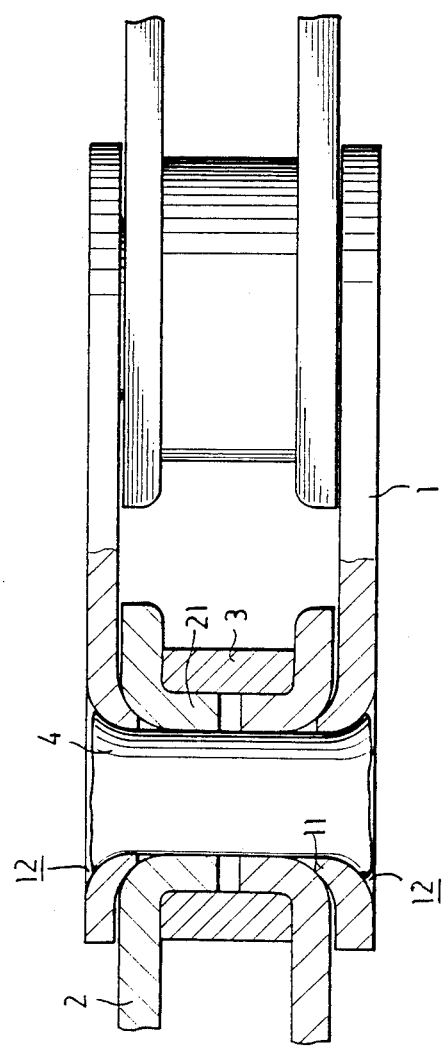
FIG. 3 is partial cross sectional view of the coupling portion of the chain.
Figure 4:
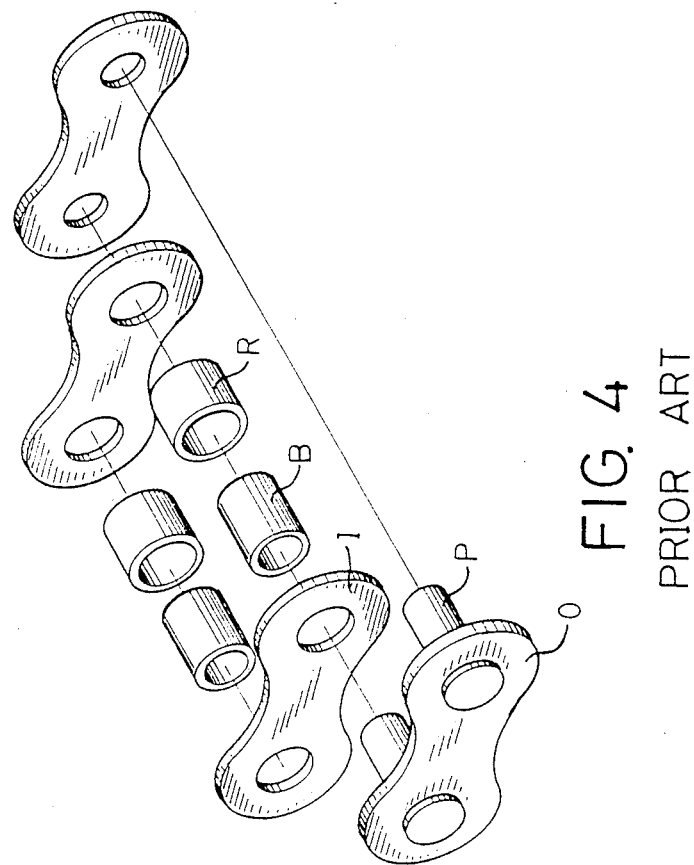
FIG. 4 is an exploded view of a conventional chain.
Figure 5:
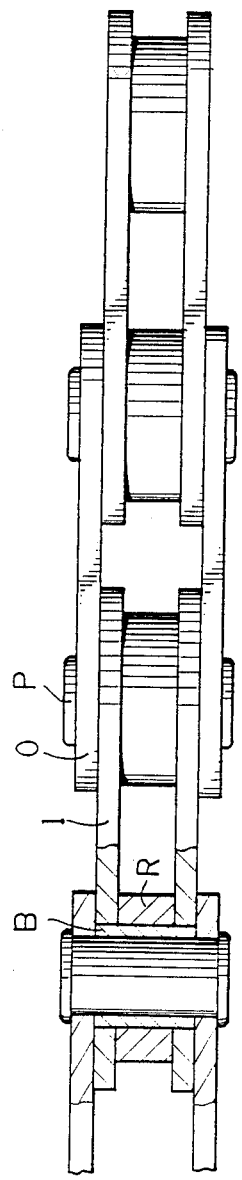
FIG. 5 is a partial cross sectionanl view of the conventional chain.

Referring next to FIG. 3, the pin 4 is inserted through the annular flanges 11, 21 of a pair of inner sheets 2 and a pair of outer sheets 1. Both ends of the pin 4 are pressed or deformed so that the ends are enlarged and are engaged in the recesses 12 of the outer sheet 1. The ends of the pin 4 are substantially embedded in the outer sheets 1 so that the outer surfaces of the outer sheets 1 are flat and have no protrusions.

Accordingly, the coupling portion of the chain in accordance with the present invention has a flat outer surface without protrusions. The chain is particularly suitable for being used in the bicycles which have shifting gears for changing speeds.

Although this invention has been descibed with a certain degree of particularity, it is to be understood that the present disclosure has been made by way of example only and that numerous changes in the detailed construction and the combination and arrangement of parts may be restored to without departing from the spirit and scope of the invention as hereinafter claimed.

I claim:

1. A coupling portion of a chain, said chain comprising a plurality pairs of inner sheets and a plurality pairs of outer sheets alternatively coupled together; each said inner sheet having two first rings integrally formed together, a first annular flange being formed on a center of each said first ring and being substantially perpendicular to said inner sheet; each said outer sheet having two second rings integrally formed together, a second annular flange being formed on a center of each said second ring and being substantially perpendicular to said outer sheet, a width of each said second annular flange being gradually decreased toward a free edge thereof; an inner surface of an opposite end to a free edge of each said first annular flange being rounded so as to form a first recess, and an inner surface of an opposite end to said free edge of each said second annular flange being rounded so as to form a second recess; a pair of rollers being rotatably supported between each pair of said inner sheets around said first annular flanges of said inner sheets; each said second annular flange of said outer sheet being received and engaged in a respective first recess; a pin having a depression formed in each end thereof, said pin being inserted through a pair of said first annular flanges and a respective pair of said second annular flanges which are aligned, both ends of said pin being deformed so as to be enlarged and engaged in said second recesses and being substantially embedded in said outer sheets so that said outer sheets have a flat outer surface without protrusions.

* * * * *